US012363418B2

(12) United States Patent
VanBlon et al.

(10) Patent No.: US 12,363,418 B2
(45) Date of Patent: Jul. 15, 2025

(54) VIDEO ACTIVATION BASED UPON DETECTION OF USER ACTION (71) Applicant: Lenovo (Singapore) Pte. Ltd., Singapore (SG)

(72) Inventors: Russell Speight VanBlon, Raleigh, NC (US); Kevin W Beck, Raleigh, NC (US); Thorsten Stremlau, Morrisville, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 99 days.

(21) Appl. No.: 17/700,865

(22) Filed: Mar. 22, 2022

(65) Prior Publication Data
US 2023/0319391 A1 Oct. 5, 2023

(51) Int. Cl.
*H04N 23/61* (2023.01)
*H04L 12/18* (2006.01)
*H04N 7/14* (2006.01)
*H04N 7/15* (2006.01)

(52) U.S. Cl.
CPC ......... *H04N 23/61* (2023.01); *H04L 12/1822* (2013.01); *H04L 12/1831* (2013.01); *H04N 7/147* (2013.01); *H04N 7/152* (2013.01)

(58) Field of Classification Search
CPC ........ H04N 23/61; H04N 7/147; H04N 7/152; H04L 12/1822; H04L 12/1831
See application file for complete search history.

(56) References Cited

U.S. PATENT DOCUMENTS

| 11,184,560 | B1* | 11/2021 | Mese | G10L 17/00 |
| 2013/0155255 | A1* | 6/2013 | Yu | H04N 23/61 |
| | | | | 348/211.99 |
| 2015/0177841 | A1* | 6/2015 | VanBlon | G06F 3/0346 |
| | | | | 715/863 |
| 2015/0331490 | A1* | 11/2015 | Yamada | G06F 3/017 |
| | | | | 345/156 |
| 2016/0057385 | A1* | 2/2016 | Burenius | H04N 7/147 |
| | | | | 348/14.16 |
| 2016/0241783 | A1* | 8/2016 | Fukui | H04N 23/62 |
| 2016/0266651 | A1* | 9/2016 | Hampiholi | G06F 3/005 |
| 2018/0376108 | A1* | 12/2018 | Bright-Thomas | G06V 20/40 |
| 2019/0289198 | A1* | 9/2019 | Bosworth | G06T 19/006 |
| 2021/0185387 | A1* | 6/2021 | Kemp | H04N 21/4334 |

(Continued)

*Primary Examiner* — James T Tsai
(74) *Attorney, Agent, or Firm* — FERENCE & ASSOCIATES LLC (57) ABSTRACT One embodiment provides a method, including: identifying, using one or more sensors of a central communication system, a user action performed by the user at one of a plurality of image capturing devices, wherein each of the plurality of image capturing devices is associated with a video capture feed separate from a video capture feed of the other of the plurality of image capturing devices; determining, at the central communication system, the user action corresponds to a video capture action command; activating, at the central communication system and responsive to the determining, the one of the plurality of image capturing devices; and capturing and transmitting the video capture feed of the one of the plurality of image capturing devices to one or more information handling devices that are communicating with the central communication system. Other aspects are described and claimed.

20 Claims, 4 Drawing Sheets

(56) References Cited

U.S. PATENT DOCUMENTS

| | | | |
|---|---|---|---|
| 2021/0400142 A1* | 12/2021 | Jorasch | H04L 65/403 |
| 2022/0400023 A1* | 12/2022 | Agrawal | G06V 40/28 |
| 2023/0036861 A1* | 2/2023 | Lum | G06V 40/193 |
| 2024/0179357 A1* | 5/2024 | Bjorkman et al. | H04N 21/234 |

* cited by examiner

VIDEO ACTIVATION BASED UPON DETECTION OF USER ACTION

BACKGROUND

Video-conferencing has become a common business practice over the recent past. Immediate changes in the world required immediate changes in the workplace. Video-conferencing commonly permits a face-to-face interaction from a remote location with one or more colleagues, superiors, audience members, and the like. In this short time of implementing the regular use of video-conferencing techniques in the workplace, users have transitioned this routinely face-to-face meeting method to including the sharing of document information, websites, the user's screen, and/or the like, across a video call to assist with presentations and/or provide clarity for a topic. For example, a user may elect to show a flow graph when describing a new business method over a video-conferencing call.

BRIEF SUMMARY

In summary, one aspect provides a method, including: identifying, using one or more sensors of a central communication system, a user action performed by the user at one of a plurality of image capturing devices, wherein each of the plurality of image capturing devices is associated with a video capture feed separate from a video capture feed of the other of the plurality of image capturing devices Another aspect provides an information handling device, including: one or more sensors; a plurality of image capturing devices; a processor operatively coupled to the one or more sensors and the plurality of image capturing devices; and a memory device that stores instructions that when executed by the processor cause the information handling device to: identify, using one or more sensors, a user action performed by a user at one of a plurality of image capturing devices, wherein each of the plurality of image capturing devices is associated with a video capture feed separate from a video capture feed of the other of the plurality of image capturing devices; determine the user action corresponds to a video capture activation command; activate, responsive to the determine, the one of the plurality of image capturing devices; and capture and transmit the video capture feed of the one of the plurality of image capturing devices to one or more information handling devices that are communicating with the central communication system.

A further aspect provides a product, including: a storage device that stores code executable by a processor and, when executed by the processor, cause the product to: identify, using one or more sensors of a central communication system, a user action performed by a user at one of a plurality of image capturing devices, wherein each of the plurality of image capturing devices is associated with a video capture feed separate from a video capture feed of the other of the plurality of image capturing devices; determine, at the central communication system, the user action corresponds to a video capture activation command; activate, at the central communication system and responsive to the determine, the one of the plurality of image capturing devices; and capture and transmit the video capture feature of the one of the plurality of image capturing devices to one or more information handling devices that are communicating with the central communication system.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

DETAILED DESCRIPTION

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, the appearance of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, et cetera. In other instances, well known structures, materials, or operations are not shown or described in detail to avoid obfuscation.

Transitioning between a video feed within a video-conferencing call is tedious and subject to human error. In conventional methods, when attempting to transition between video feeds, for example, from a camera capturing an image of the user to a camera capturing a white-board, desk top area, or other location in an environment, a user must manually select between one or more feeds. The selection then results in the selected video feed being supplied to the viewers of the video feed. For example, in a video conferencing application, this manual switching between feeds, and/or activating a new feed, requires a user to access a portion of the application (e.g., a drop-down arrow) and select the correct video feed, which is usually not labeled or otherwise identified with some helpful label that would indicate which video feed should be selected. Thus, the switching between feeds requires time and accuracy on the behalf of a presenter, and may easily result in selection of an incorrect video feed, resulting in using additional time.

The manual selection of video feeds or active cameras used as a presentation camera also is present when attempting to adjust a video characteristic, for example, a pan or zoom adjustment. A presenter must manually pan across an image (e.g., dragging within a window, scrolling within a window, etc.), manually select a zoom-type (in/out), typically along a border of a document within an application, and/or the like. Once again, these manual inputs are time consuming and subject to human error, which results in frustration and a waste of time for both the presenter and the participants receiving the video feeds.

Accordingly, an embodiment provides a method for activating an image capturing device, within a network and in communication with a central communication system, to capture and transmit a specific video feed to each active device in communication with the central communication system. An embodiment may identify which image capturing device within the network a user is attempting to activate by tracking a user action associated with an image capturing device. A system, while active in an application that supports video feeds being shared among participants in the application, for example, a conferencing application, may then transition from an original video feed to the video feed of the activated image capturing device to spotlight a portion, or an entirety, of an image being captured.

The central communication system then assists in transmitting the captured video feed from the active image capturing device to a plurality of other devices connected through the communication system, for example, the conference participant information handling devices. After the presentation of information from the active camera is complete, a user may transition back to viewing a video feed associated with an original feed or, for example, a user may transition to another video feed from a separate image capturing device. This transition may also occur through the use of the user action or may be the result of a time-out from the video feed that was previously active. Such a method may allow a system to transition between video feeds, and/or adjust one or more characteristics of a video feed being viewed, automatically based upon the detection of a determined user action.

The illustrated example embodiments will be best understood by reference to the figures. The following description is intended only by way of example, and simply illustrates certain example embodiments.

Figure 1:
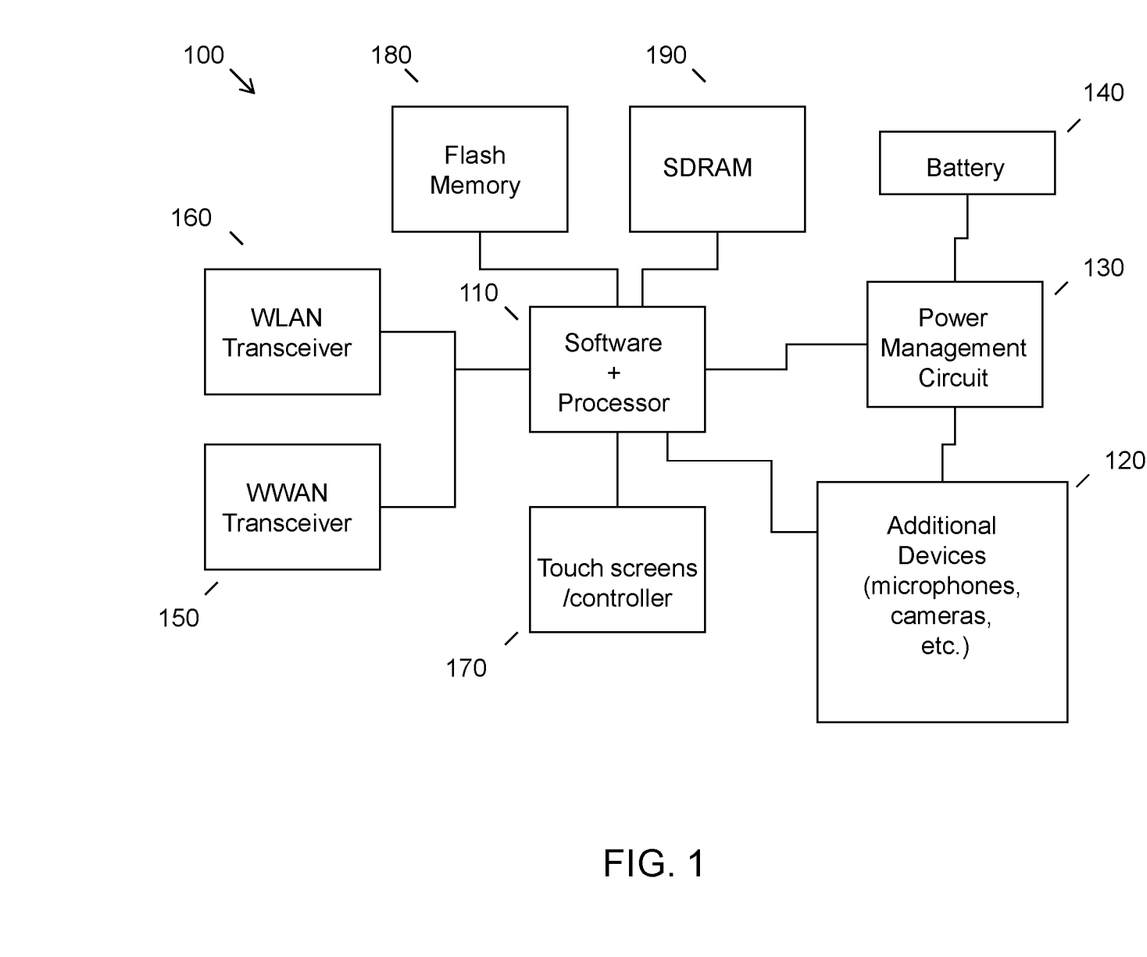
FIG. 1 illustrates an example of information handling device circuitry.

While various other circuits, circuitry or components may be utilized in information handling devices, with regard to smart phone and/or tablet circuitry 100, an example illustrated in FIG. 1 includes a system on a chip design found for example in tablet or other mobile computing platforms. Software and processor(s) are combined in a single chip 110. Processors comprise internal arithmetic units, registers, cache memory, busses, input/output (I/O) ports, etc., as is well known in the art. Internal busses and the like depend on different vendors, but essentially all the peripheral devices (120) may attach to a single chip 110. The circuitry 100 combines the processor, memory control, and I/O controller hub all into a single chip 110. Also, systems 100 of this type do not typically use serial advanced technology attachment (SATA) or peripheral component interconnect (PCI) or low pin count (LPC). Common interfaces, for example, include secure digital input/output (SDIO) and inter-integrated circuit (I2C).

There are power management chip(s) 130, e.g., a battery management unit, BMU, which manage power as supplied, for example, via a rechargeable battery 140, which may be recharged by a connection to a power source (not shown). In at least one design, a single chip, such as 110, is used to supply basic input/output system (BIOS) like functionality and dynamic random-access memory (DRAM) memory.

System 100 typically includes one or more of a wireless wide area network (WWAN) transceiver 150 and a wireless local area network (WLAN) transceiver 160 for connecting to various networks, such as telecommunications networks and wireless Internet devices, e.g., access points. Additionally, devices 120 are commonly included, e.g., a wireless communication device, external storage, etc. System 100 often includes a touch screen 170 for data input and display/rendering. System 100 also typically includes various memory devices, for example flash memory 180 and synchronous dynamic random-access memory (SDRAM) 190.

Figure 2:
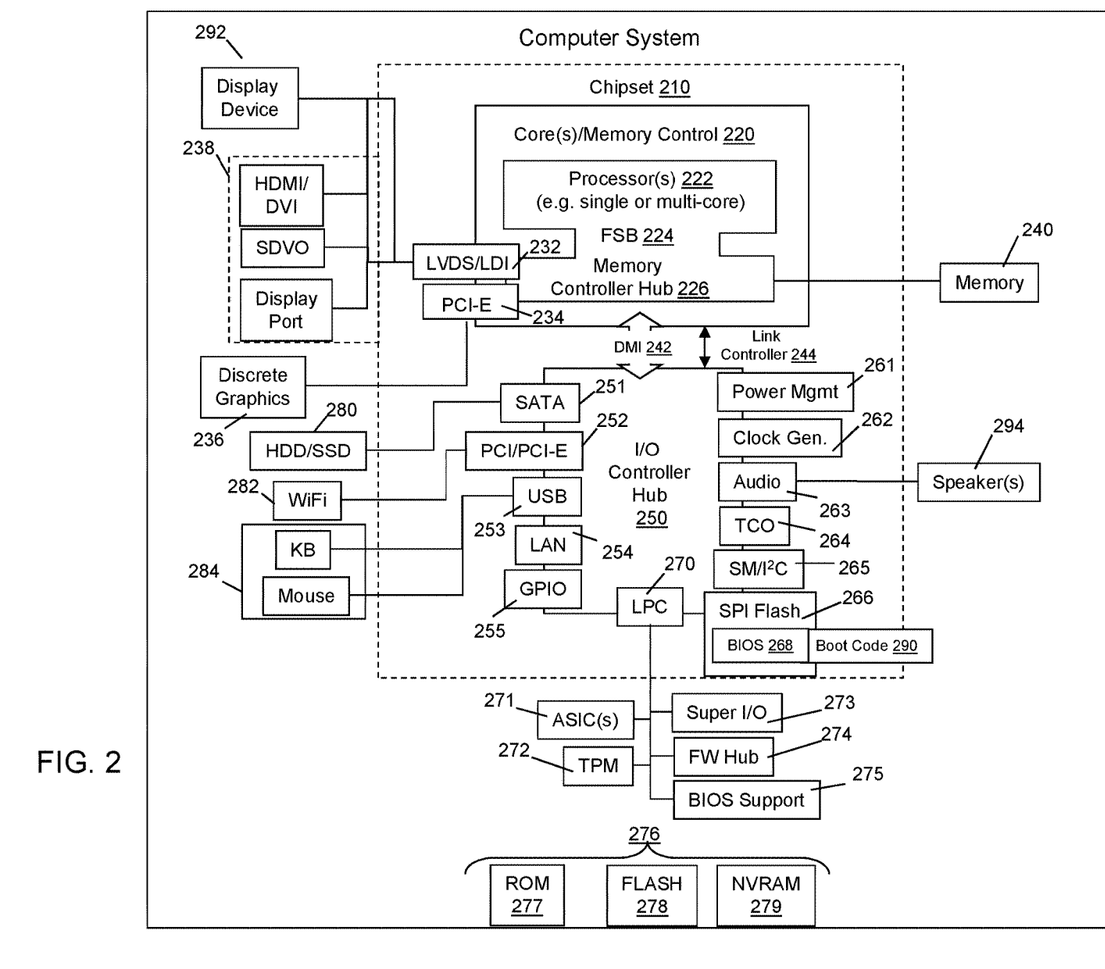
FIG. 2 illustrates another example of information handling device circuitry.

FIG. 2 depicts a block diagram of another example of information handling device circuits, circuitry or components. The example depicted in FIG. 2 may correspond to computing systems such as personal computers, or other devices. As is apparent from the description herein, embodiments may include other features or only some of the features of the example illustrated in FIG. 2.

The example of FIG. 2 includes a so-called chipset 210 (a group of integrated circuits, or chips, that work together, chipsets) with an architecture that may vary depending on manufacturer. The architecture of the chipset 210 includes a core and memory control group 220 and an I/O controller hub 250 that exchanges information (for example, data, signals, commands, etc.) via a direct management interface (DMI) 242 or a link controller 244. In FIG. 2, the DMI 242 is a chip-to-chip interface (sometimes referred to as being a link between a "northbridge" and a "southbridge"). The core and memory control group 220 include one or more processors 222 (for example, single or multi-core) and a memory controller hub 226 that exchange information via a front side bus (FSB) 224; noting that components of the group 220 may be integrated in a chip that supplants the conventional "northbridge" style architecture. One or more processors 222 comprise internal arithmetic units, registers, cache memory, busses, I/O ports, etc., as is well known in the art.

In FIG. 2, the memory controller hub 226 interfaces with memory 240 (for example, to provide support for a type of random-access memory (RAM) that may be referred to as "system memory" or "memory"). The memory controller hub 226 further includes a low voltage differential signaling (LVDS) interface 232 for a display device 292 (for example, a cathode-ray tube (CRT), a flat panel, touch screen, etc.). A block 238 includes some technologies that may be supported via the low-voltage differential signaling (LVDS) interface 232 (for example, serial digital video, high-definition multimedia interface/digital visual interface (HDMI/DVI), display port). The memory controller hub 226 also includes a PCI-express interface (PCI-E) 234 that may support discrete graphics 236.

In FIG. 2, the I/O hub controller 250 includes a SATA interface 251 (for example, for hard-disc drives (HDDs), solid-state drives (SSDs), etc., 280), a PCI-E interface 252 (for example, for wireless connections 282), a universal serial bus (USB) interface 253 (for example, for devices 284 such as a digitizer, keyboard, mice, cameras, phones, microphones, storage, other connected devices, etc.), a network interface 254 (for example, local area network (LAN)), a general purpose I/O (GPIO) interface 255, a LPC interface 270 (for application-specific integrated circuit (ASICs) 271, a trusted platform module (TPM) 272, a super I/O 273, a firmware hub 274, BIOS support 275 as well as various types of memory 276 such as read-only memory (ROM) 277, Flash 278, and non-volatile RAM (NVRAM) 279), a power management interface 261, a clock generator interface 262, an audio interface 263 (for example, for speakers 294), a time controlled operations (TCO) interface 264, a system management bus interface 265, and serial peripheral interface (SPI) Flash 266, which can include BIOS 268 and boot code 290. The I/O hub controller 250 may include gigabit Ethernet support.

The system, upon power on, may be configured to execute boot code 290 for the BIOS 268, as stored within the SPI Flash 266, and thereafter processes data under the control of one or more operating systems and application software (for example, stored in system memory 240). An operating system may be stored in any of a variety of locations and accessed, for example, according to instructions of the BIOS 268. As described herein, a device may include fewer or more features than shown in the system of FIG. 2.

Information handling device circuitry, as for example outlined in FIG. 1 or FIG. 2, may be used in devices such as tablets, smart phones, personal computer devices generally, and/or electronic devices, which may be used in systems that capture video feeds and/or that are used for communication connections between users. For example, the circuitry outlined in FIG. 1 may be implemented in a tablet or smart phone embodiment, whereas the circuitry outlined in FIG. 2 may be implemented in a personal computer embodiment.

Figure 3:
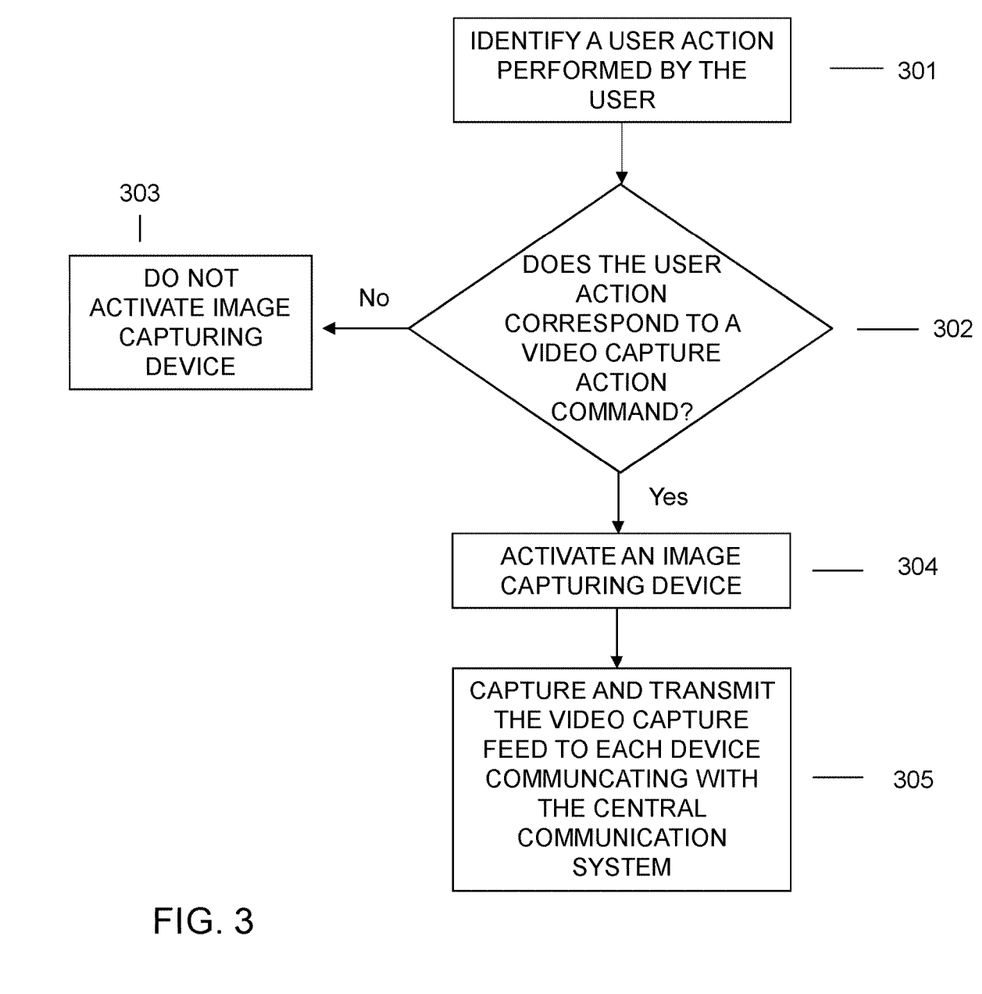
FIG. 3 illustrates an example method of activating an image capturing device in response to identifying a user action performed at one of a plurality of image capturing devices and, thereafter, capturing and transmitting a video feed to each device in communication with a central communication system.

FIG. 3 illustrates an example method for activating an image capturing device in response to identifying a user action performed at one of a plurality of image capturing devices and, thereafter, capturing and transmitting a video feed to each device in communication with a central communication system. The method may be implemented on a system which includes a processor, memory device, a central communication system, output devices (e.g., display device, etc.), input devices (e.g., keyboard, touch screen, mouse, microphones, sensors, etc.), image capturing devices, and/or other components, for example, those discussed in connection with FIG. 1 and/or FIG. 2 and FIG. 4. While the system may include known hardware and software components and/or hardware and software components developed in the future, the system itself is specifically programed to perform the functions as described herein to activate an image capturing device based upon the identification of a user action, and provide the video from the activated image capturing device to a plurality of devices in communication with a central communication system. Additionally, the video feed capturing and transmission system and central communication system includes features that are unique to the described system.

At 301, the video feed capturing and transmission system may identify a user action performed by a user at one of a plurality of image capturing devices. As described herein, the image capturing device may correspond to any device that may capture data associated with an image. For example, the image capturing device may include a smart phone, a digital camera, a sonar gun, a video camera, a web camera, and/or the like. For ease of understanding throughout this application, continued reference to a camera, and specifically, a video camera, is utilized. However, it is important to regard such a use of a video camera as a non-limiting example.

Additionally, as an ongoing non-limiting example, the use of a plurality of video cameras within a conference or meeting facilitated through the use of applications running on individual information handling devices will be utilized. In other words, the example use case is a conference call or other meeting held at least partially virtually among a plurality of participants through a meeting application that allows video transmission, where each participant has a corresponding device that receives and transmits video. Each participant does not have to have a unique device, as two or more participants may be physically located in the same space and utilize a single device.

To identify a user action performed by the user at an image capturing device, one or more sensors operatively coupled to a central communication system may collect motion data associated with an action that the user is performing, and where the actor is performing the action. In an embodiment, the user performing an action may be recognized by one image capturing device that may be in communication with a plurality of other image capturing devices. A network of image capturing devices may be in communication with the central communication system, and when a system identifies that a user action is performed, the presence of the action may be communicated back to the central communication system. Each image capturing device may be associated with an individual video feed, which is separate from the video feeds associated with the other image capturing devices present within the network. For example, an image capturing device present on a user's laptop may be capturing in the video feed, the face of the user, while simultaneously, the image capturing device of separate user present on the separate user's laptop may capture a separate video feed, capturing the face of the separate user. Both of these video feeds may be fed into a central communication system, and thereafter supplied to a singular location, for example, a video-conferencing meeting.

The action performed by the user at an image capturing device and, thus, identifying the action performed, may be based upon association with one or more predetermined actions. As an example, the action being performed may be a user performing a gesture at the image capturing device, for example, the user making a waving motion in front of an image capturing device. As another example, the action identified by an image capturing device may be include the recognition of a predetermined spoken word. A predetermined spoken word may be a wake word for the device. As another example, the action identified by an image capturing device may include the recognition of a predetermined object held by the user, for example, a stylus may be identified in the scene of an image capturing device, where the stylus has a predetermined association with the image capturing device.

As another example, the action identified by an image capturing device may include the recognition of a predetermined drawing or mark made by the user. For example, the motion of a user's hand may be present in the scene of an image capturing device. However, in this example, action of the hand alone is not enough to trigger the activation of the image capturing device. As the user draws two symbols on a surface that an image capturing device is directed towards, an embodiment may recognize that the orientation of the symbols correlate to an identified user action that is associated with activating the camera, and thereafter may activate the image capturing device directed at the surface. Thus, identifying the user action may be performed using one or more sensors of the central communication system, for example, image capture sensors, proximity sensors, microphones, biometric sensors, infrared sensors, near-field communication sensors, and/or the like.

The user action may be performed at one of a plurality of image capturing devices, with each device having a video capture feed separate from a video capture feed of other of the devices. In other words, each device can capture separate, individual, and unique video images and transmit a unique video feed corresponding to the device that captured the video images. Generally, the system is deployed in an environment that has multiple image capturing devices and the system allows for quick and seamless transition between any of the image capturing devices. For example, the user may have one device that is directed towards the user and that captures images of the user and another device that is directed towards a desk top, whiteboard, presentation surface, and/or the like, that may be used to provide drawing, writing, or other image input.

Based upon receipt of the user action at 301, the central communication system may determine whether the user action corresponds to a video capture action command at 302. This determination may be made using a simple comparison where the user action received at 301 is compared to stored user actions that have been identified as video capture actions. Upon determination of a match, the system identifies the user action as a video capture action. More complex determinations may also be made, for example, using historical information, crowd-sourced information, machine-learning or other learning algorithms, or the like. Historical information may identify actions taken by the user that have then resulted in the user switching the video feed from one image capturing device to another. These actions can then be associated with a video capture action and when those actions are identified subsequently, the system can automatically switch the video feed instead of the user having to manually perform the switching. Crowd-sourced information can be used in a similar manner, except that the user action/video switching correlations are based upon information from a plurality of users instead of only the current user.

In a machine-learning or other learning algorithm, a machine-learning model can be employed. The machine-learning model can be trained using information that identifies correlations between user actions and image capturing device activation. The trained model can then be deployed and make predictions regarding user actions and whether those actions should activate a particular image capturing device. During deployment, the model can receive feedback on predictions (e.g., a user undoing an action performed based upon the model, a user activating an image capture device after the model made a prediction, etc.) and use the feedback to become more accurate regarding future predictions. Thus, the model can re-train itself during deployment.

Recognition of a predetermined gesture made, word spoken, predetermined object held, predetermined drawing made, and/or the like, by the user results in determining that a user action does correspond to a video capture action command at 302, and thereafter cause the system to activate an image capturing device corresponding to the device that received the user action at 304. On the other hand, when the user action being performed by the user is determined to not correspond to a video capture action command at 302, the system will not activate an image capturing device at 303. In other words, the system will not change the video feed that is currently capturing video, referred to as the original image capturing device.

It is important to remember that prior to the user performing a potential user action, an original image capturing device may be capturing a video. However, when determining whether a user action corresponds to a video capture action command, the embodiment is attempting to determine whether to activate another image capturing device present in the network of devices in communication with the central communication system. Thus, when the user action does not correspond to a video capture action command, the original image capturing device may remain in an active state, and the system will not activate a separate image capturing device at 303.

When it is determined that the user action corresponds to a video capture action command at 302, the system may activate an image capturing device at 304. This image capturing device would be a device other than the original image capturing device. Since the central communication system is in communication with a plurality of devices, including a plurality of image capturing devices, upon determining the user action corresponds to a video capture action command, the central communication system may activate the image capturing device. Activation of the image capturing device may occur automatically. In other words, in response to the determining the user action to be a video capture action command, the activation of the image capturing device may occur without additional user input.

Automatically activating the image capturing device may permit a system to turn-on an image capturing device immediately after the determined presence of a video capture action command provided by the user. Thus, the described system reduces an amount of time needed to activate the image capturing device, and thereafter, quickly capture image data in the activated image capturing device's video feed. Additionally, or alternatively, in an embodiment, when activating the image capturing device, manual input provided by the user permitting the activation of the image capturing device may be included. For example, the system may ask the user to confirm that the image capturing device should be activated. This confirmation may occur through a pop-up window, voice output/input, confirmation gesture request/receipt, and/or the like. For example, the system may ask the user to perform another user action that corresponds to a video capture action command.

When it is previously determined that a video feed being provided from an original image capturing device is already being provided to the plurality of devices communicating with the central communication system, and when activating a separate, or new, image capturing device present within the network of devices, the system may de-activate the previously active image capturing device. For example, when in a video-conferencing call, the image capturing device facing a user may be providing a video feed that includes the user's face. Upon determining that an action performed by the user corresponds to a video capture action command, and activating a new image capturing device, the system may de-activate the original image capturing device with the video feed of the user's face in response to activating the separate, or new, image capturing device that may be directed at a different location within the environment, for example, a surface (e.g., whiteboard, blackboard, smartboard, etc.).

Additionally, or alternatively, in an embodiment that also includes an original image capturing device with an active video feed that then recognizes an action command and further activates a separate image capturing device, instead of deactivating the original image capturing device, the system may activate a second video feed from the separate image capturing device. In other words, both video feeds from the original image capturing device and the new device may be active. The new device video feed may then be transmitted in addition to the original video feed. Thus, in an embodiment with two active image capturing devices, both video feeds may be captured and transmitted to the central communication system, and then to each device in communication with the central communication system.

Upon activating an image capturing device, the system may capture and transmit the video capture feed of the one or more image capturing devices to each device communicating with the central communication system at 305. The central communication system acts a middle ground for each device present in a network, as well as a collection point, for additional devices attempting to access the central communication system via an application. For example, on a video-conferencing call, a central communication system may permit the communication of a plurality of devices accessing a singular location within the central communication system. This permitting by the central communication system is why multiple users may communicate over a video-conferencing call from separate devices.

Additionally, and as mentioned previously, it is also the central communication system that connects that plurality of devices, including image capturing devices, within a network. Thus, when capturing and transmitting the video capture feed of the image capturing device to one or more information handling devices, for example, multiple user devices in a video-conferencing call, the devices are communicating with each other via the central communication system. Therefore, in an embodiment, the capturing and transmitting of the video capture feed to each device communicating with the central communication system may occur automatically between the devices connected together by the central communication system.

In an embodiment, the transmitting of the capture feed occurring automatically upon the activation of the image capturing device, may provide the one or more users viewing the feed with a seamless transition between an original video feed, or static image, and the video feed of the new image capturing device. In an embodiment, when transmitting the video feed from the activated image capturing device, as mentioned previously, the central communication system may de-activate one of the image capturing devices (e.g., the original image capturing device) responsive to receiving the second feed. Alternatively, as also previously mentioned, the second video feed (or third, fourth, etc., video feed) may be transmitted along with the original video feed.

Once the video feed is activated, the central communication system may detect a second user action that corresponds to a contradictory action in view of the user action, and in response to detection of this contradictory action, the central communication system may de-activate an image capturing device present in the network of active devices. In other words, an embodiment may deactivate an image capturing device in response to a contradictory action. For example, if an image capturing device is active in response to the spoken user action, "hello," a contradictory spoken user action that may de-activate the image capturing device may be, "goodbye." In another example, if the user implements a predetermined drawing symbol or gesture to activate an image capturing device, a contradictory action performed by the user may be erasing a drawing, thus, de-activating the image capturing device. The deactivating commands may be identified using any of the techniques described in connection with the activation commands (i.e., the video capture action command).

In an embodiment, when capturing and transmitting the video capture feed to each device communicating with the central communication system, the system may also capture and transmit attributes of the image capturing device. In an embodiment, these attributes may include utilizing a zoom method to either zoom-in on a specific area of a captured video feed, or zoom-out. In an embodiment, and as will be seen in FIG. 4, symbols with predetermined meanings may be captured in a video feed, which may instruct an image capturing device to adjust an attribute of the feed.

Figure 4:
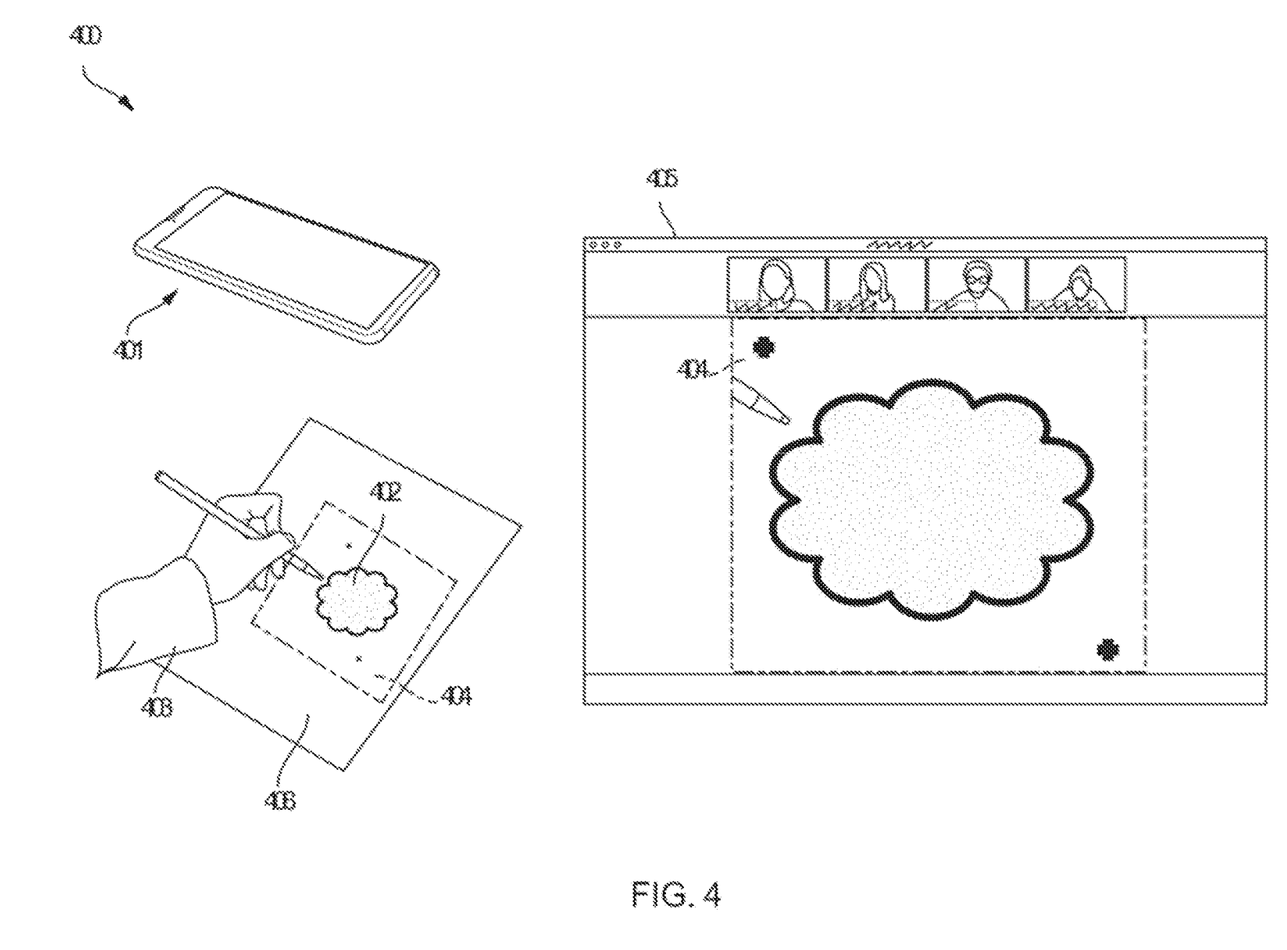
FIG. 4 illustrates an example single camera setup.

For example, in an embodiment, an image capturing device transmitting a video feed to each device communicating with the central communication system may recognize a symbol "+" present along the top left corner of an image on a surface, and a second "+" present at the bottom left corner. The presence of the two "+" symbols has a predetermined meaning to zoom-in on a portion of the video feed encompassed by the two symbols. In another example, a user may outline the information a user wishes to focus on by drawing a closed rectangle around the information, and an embodiment may focus the video feed of the image capturing device on the outlined area. Further attribute adjustments may include, for example, panning across a video feed (which may have been previously zoomed in), a scroll lock attribute adjustment, and the like, which all may have corresponding actions or symbols that activate each of the attribute adjustments.

Referring to FIG. 4, the figure provides an example single camera setup that may identify a user action performed by a user, determine the user action corresponds to a video capture action command, activate an image capturing device, and capture and transmit the video capture feed to each device communicating with the central communication system. As was previously mentioned, FIG. 4 represents an example embodiment and is not intended to be limiting. The single camera set up 400 is made up of multiple components. On the left side of the single camera set up 400, an information handling device including a single, downward facing camera 401 is present above a surface. This information handing device with the downward facing camera 401 may be used to capture a video feed containing information present on the surface. In this example embodiment, in order to activate the camera 401, or the image capturing device, a user may perform the action of waving with their hand 403, or providing a motion below the camera 401. After the user action has been identified and the system determines that the action provided corresponds to a video capture action command, the system may activate the camera 401.

Initially, when activating the camera 401 by waving the user's arm 403 in front of the camera lens 401, the video feed may be a wide-field, or zoomed out, view to capture the most information possible. For example, the initial setting of the camera 401 may capture the entirety of notebook, or surface 406. On this surface the user may provide a drawing in real-time, or the drawing 402 may be present prior to activating the camera 401. Regardless of when the drawing 402 is made, a user may determine that the image 402 on the video feed may be too small to understand the drawing 402. Thus, in an embodiment, a user may provide a "+" symbol 404 at the top right of the image and the bottom left of the image. These strategically placed symbols may produce a virtual rectangle, which is represented by the boarder surrounding 402, and may also have the predetermined meaning to zoom-in on the virtual rectangle surrounding the drawing 402.

Once the system determines that the symbols 404 provided by the user surround drawing 402, an embodiment may capture and transmit the zoomed-in video feed to the plurality of devices communicating with the central communication system outputting the video feed present in application 405. Application 405 may be a video-conferencing application hosting multiple users viewing the video stream captured by camera 401. As can be seen in the application window 405, the drawing 402 is zoomed in, and only the surface 406 that the drawing 402 is present on and surrounded by symbols 404 is presented within the window 405. This zoomed-in version of the surface 405 provides clarity regarding drawing 402 that could be understood when the entirety of the surface 406 was being transmitted to the plurality of viewers viewing the application 405.

The various embodiments described herein thus represent a technical improvement to conventional methods of capturing and transmitting a video capture feed to a plurality of user devices. Rather than requiring a user to manual input and transition between video feeds and attribute adjustments to the video feed, the described system and method permits a system in communication with a central communication system to automatically perform video feed transmission and adjustment based upon an identified user action, and the utilization of one or more image capturing devices present in a network. The system is able to activate, based upon a determined corresponding video capture action, one or more image capturing devices that may capture a video feed and seamlessly transmit the video feed to the central communication system, and thereafter the devices communicating with the central commutation system. Such an embodiment may allow a system to transition between video feeds, and/or adjust one or more attributes of a video feed, automatically based upon the presence of a determined user action, thereby saving time and preventing user mistakes and/or frustration.

As will be appreciated by one skilled in the art, various aspects may be embodied as a system, method or device program product. Accordingly, aspects may take the form of an entirely hardware embodiment or an embodiment including software that may all generally be referred to herein as a "circuit," "module" or "system." Furthermore, aspects may take the form of a device program product embodied in one or more device readable medium(s) having device readable program code embodied therewith.

It should be noted that the various functions described herein may be implemented using instructions stored on a device readable storage medium such as a non-signal storage device that are executed by a processor. A storage device may be, for example, a system, apparatus, or device (e.g., an electronic, magnetic, optical, electromagnetic, infrared, or semiconductor system, apparatus, or device) or any suitable combination of the foregoing. More specific examples of a storage device/medium include the following: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a storage device is not a signal and "non-transitory" includes all media except signal media.

Program code embodied on a storage medium may be transmitted using any appropriate medium, including but not limited to wireless, wireline, optical fiber cable, RF, et cetera, or any suitable combination of the foregoing.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of connection or network, including a local area network (LAN) or a wide area network (WAN), or the connection may be made through other devices (for example, through the Internet using an Internet Service Provider), through wireless connections, e.g., near-field communication, or through a hard wire connection, such as over a USB connection.

Example embodiments are described herein with reference to the figures, which illustrate example methods, devices and program products according to various example embodiments. It will be understood that the actions and functionality may be implemented at least in part by program instructions. These program instructions may be provided to a processor of a device, a special purpose information handling device, or other programmable data processing device to produce a machine, such that the instructions, which execute via a processor of the device implement the functions/acts specified.

It is worth noting that while specific blocks are used in the figures, and a particular ordering of blocks has been illustrated, these are non-limiting examples. In certain contexts, two or more blocks may be combined, a block may be split into two or more blocks, or certain blocks may be re-ordered or re-organized as appropriate, as the explicit illustrated examples are used only for descriptive purposes and are not to be construed as limiting.

As used herein, the singular "a" and "an" may be construed as including the plural "one or more" unless clearly indicated otherwise.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting and that various other changes and modifications may be affected therein by one skilled in the art without departing from the scope or spirit of the disclosure.

What is claimed is:

1. A method, comprising:
   identifying, using one or more sensors of a central communication system, a user action performed by the user at one of a plurality of image capturing devices, wherein each of the plurality of image capturing devices is associated with a video capture feed separate from a video capture feed of the other of the plurality of image capturing devices;
   determining, at the central communication system employing a machine-learning model, the user action corresponds to a video capture action command, wherein the determining comprises the machine-learning model identifying correlations between the user action and the corresponding video capture command by comparing the user action to a plurality of stored user actions that have been identified as video capture action commands, wherein each of the identified video capture action commands are associated with one of the plurality of image capturing devices, wherein the stored user actions train the machine-learning model and wherein each of the identified video capture action commands are collected from at least one of: user historical information and crowd-sourced information;

automatically activating, at the central communication system and responsive to the determining, the one of the plurality of image capturing devices, wherein the activating comprises identifying attributes for the video capture feed based upon information contained within an image in the video capture feed and adjusting attributes of the one of plurality of image capturing devices based upon the identified attributes, wherein the activating comprises activating an additional image capturing device from the plurality of image capturing devices, wherein the activating the additional image capturing device comprises at least one of: activating a secondary video capture feed from the additional image capturing device and de-activating a previously active image capture device; and capturing and transmitting the video capture feed of the one of the plurality of image capturing devices to one or more information handling devices that are communicating with the central communication system.

2. The method of claim 1, wherein each of the information handling devices corresponds to one or more attendees of a meeting facilitated using the central communication system.

3. The method of claim 1, wherein the automatic activation occurs based upon the one of the plurality of image capturing devices corresponding to a particular image capturing device.

4. The method of claim 1, wherein the second video capture feed is transmitted in addition to a video capture feed of a previously active image capturing device.

5. The method of claim 1, further comprising:
detecting a second user action that corresponds to a contradictory action in view of the user action; and
de-activating the one of the plurality of image capturing devices responsive to receiving the second user action.

6. The method of claim 1, wherein the one or more image capturing device is a downward-facing camera.

7. The method of claim 1, wherein the user action is an action selected from the group consisting of: a predetermined spoken word by the user, a predetermined object held by the user, a predetermined action by the user, and a predetermined drawing by the user.

8. The method of claim 1, wherein the machine-learning model receives feedback on predictions to train the machine-learning model in real-time;
wherein the feedback comprises receiving user input after activating the one of the plurality of image capturing devices to re-train the machine-learning model of the central communication system and more accurately deploy future predictions;
wherein the user input comprises a manual adjustment performed by the user.

9. The method of claim 1, wherein the identifying attributes for the video capture feed based upon information contained within an image in the video capture feed comprises identifying at least one of: an action and a symbol present within the video capture feed of the one of the plurality image capturing devices;
wherein the identifying the at least of: the action and the symbol present within the video capture feed comprises activating an attribute adjustment to be made to the video capture feed.

10. The method of claim 1, wherein the adjusting attributes of the one of plurality of image capturing devices based upon the identified attributes comprises altering the video capture feed of the one of the plurality of image capturing devices based upon predetermined instruction associated with at least one of: an action and a symbol;
wherein the predetermined instruction associated with the at least one of: the action and the symbol are stored in the central communication system.

11. An information handling device, comprising:
one or more sensors;
a plurality of image capturing devices;
a processor operatively coupled to the one or more sensors and the plurality of image capturing devices; and
a memory device that stores instructions that when executed by the processor cause the information handling device to:
identify, using the one or more sensors, a user action performed by a user at one of the plurality of image capturing devices, wherein each of the plurality of image capturing devices is associated with a video capture feed separate from a video capture feed of the other of the plurality of image capturing devices;
determine, by use of a machine-learning model, the user action corresponds to a video capture activation command, wherein to determine comprises the machine-learning model identifying correlations between the user action and the corresponding video capture command by comparing the user action to a plurality of stored user actions that have been identified as video capture action commands, wherein each of the identified video capture action commands are associated with one of the plurality of image capturing devices, wherein the stored user actions train the machine-learning model and wherein each of the identified video capture action commands are collected from at least one of: user historical information and crowd-sourced information;
automatically activate, responsive to the determination, the one of the plurality of image capturing devices, wherein to activate comprises identifying attributes for the video capture feed based upon information contained within an image in the video capture feed and adjusting attributes of the one of plurality of image capturing devices based upon the identified attributes, wherein to activate comprises activating an additional image capturing device from the plurality of image capturing devices, wherein the activating the additional image capturing device comprises at least one of: activating a secondary video capture feed from the additional image capturing device and de-activating a previously active image capture device; and
capture and transmit the video capture feed of the one of the plurality of image capturing devices to one or more information handling devices that are communicating with the central communication system.

12. The information handling device of claim 11, wherein each of the information handling devices corresponds to one or more attendees of a meeting facilitated using the central communication system.

13. The information handling device of claim 11, wherein the automatic activation occurs based upon the one of the plurality of image capturing devices corresponding to a particular image capturing device.

14. The information handling device of claim 11, wherein the second video capture feed is transmitted in addition to a video capture feed of a previously active image capturing device.

15. The information handling device of claim 11, further comprises:
  detect a second user action that corresponds to a contradictory action in view of the user action; and
  de-activate the one of the plurality of image capturing device responsive to receiving the second user action.

16. The information handling device of claim 11, wherein the one or more image capturing device is a downward-facing camera.

17. The information handling device of claim 11, wherein the machine-learning model receives feedback on predictions to train the machine-learning model in real-time;
  wherein the feedback comprises receipt of user input after the activation of the one of the plurality of image capturing devices to re-train the machine-learning model of the central communication system and more accurately deploy future predictions;
  wherein the user input comprises a manual adjustment performed by the user.

18. The information handling device of claim 11, wherein the identifying attributes for the video capture feed based upon information contained within an image in the video capture feed comprises identifying at least one of: an action and a symbol present within the video capture feed of the one of the plurality image capturing devices;
  wherein the identifying the at least of: the action and the symbol present within the video capture feed comprises activating an attribute adjustment to be made to the video capture feed.

19. The information handling device of claim 11, wherein the adjusting attributes of the one of plurality of image capturing devices based upon the identified attributes comprises altering the video capture feed of the one of the plurality of image capturing devices based upon predetermined instruction associated with at least one of:
  an action and a symbol;
  wherein the predetermined instruction associated with the at least one of: the action and the symbol are stored in the central communication system.

20. A product, comprising:
  a storage device that stores code, the code being executable by a processor and, when executed by the processor, cause the product to:
    identify, using one or more sensors of a central communication system, a user action performed by a user at one of a plurality of image capturing devices, wherein each of the plurality of image capturing devices is associated with a video capture feed separate from a video capture feed of the other of the plurality of image capturing devices;
    determine, at the central communication system that employs a machine-learning model, the user action corresponds to a video capture activation command, wherein to determine comprises the machine-learning model identifying correlations between the user action and the corresponding video capture command by comparing the user action to a plurality of stored user actions that have been identified as video capture action commands, wherein each of the identified video capture action commands are associated with one of the plurality of image capturing devices, wherein the stored user actions train the machine-learning model and wherein each of the identified video capture action commands are collected from at least one of user historical information and crowd-sourced information;
    automatically activate, at the central communication system and responsive to the determine, the one of the plurality of image capturing devices, wherein to activate comprises identifying attributes for the video capture feed based upon information contained within an image in the video capture feed and adjusting attributes of the one of plurality of image capturing devices based upon the identified attributes, wherein to activate comprises activating an additional image capturing device from the plurality of image capturing devices, wherein the activating the additional image capturing device comprises at least one of: activating a secondary video capture feed from the additional image capturing device and de-activating a previously active image capture device; and
    capture and transmit the video capture feature of the one of the plurality of image capturing devices to one or more information handling devices that are communicating with the central communication system.

* * * * *